United States Patent
Despain

(10) Patent No.: US 9,915,278 B2
(45) Date of Patent: Mar. 13, 2018

(54) CLIP FOR USE WITH A COOKING DEVICE

(71) Applicant: FIREBOX OUTDOORS LLP, Moroni, UT (US)

(72) Inventor: Steven S. Despain, Moroni, UT (US)

(73) Assignee: Firebox Outdoors LLP, Moroni, UT (US)

( * ) Notice: Subject to any disclaimer, the term of this patent is extended or adjusted under 35 U.S.C. 154(b) by 0 days.

(21) Appl. No.: 15/135,079

(22) Filed: Apr. 21, 2016

(65) Prior Publication Data

US 2016/0309964 A1 Oct. 27, 2016

Related U.S. Application Data

(60) Provisional application No. 62/150,416, filed on Apr. 21, 2015.

(51) Int. Cl.
| | | |
|---|---|---|
| *A47J 47/16* | (2006.01) | |
| *F16B 2/24* | (2006.01) | |
| *A47J 36/10* | (2006.01) | |
| *A47J 45/07* | (2006.01) | |

(52) U.S. Cl.
CPC .............. *F16B 2/248* (2013.01); *A47J 36/10* (2013.01); *A47J 45/07* (2013.01)

(58) Field of Classification Search
CPC .. F16B 2/248; A47J 45/07; A47J 37/06; A47J 37/10
See application file for complete search history.

(56) References Cited

U.S. PATENT DOCUMENTS

| | | | |
|---|---|---|---|
| 2,262,273 A | 11/1941 | Agnew et al. | |
| 3,080,996 A | 3/1963 | Graham et al. | |
| 3,279,829 A * | 10/1966 | Kurtenacker | B65D 9/34 |
| | | | 217/69 |
| 5,887,751 A | 3/1999 | Kroscher et al. | |
| 6,182,557 B1 | 2/2001 | Wilk et al. | |
| 6,250,493 B1 | 6/2001 | Kwan et al. | |
| 2003/0196561 A1 | 10/2003 | Bart et al. | |
| 2004/0187265 A1 | 9/2004 | Ho et al. | |
| 2012/0225173 A1 | 9/2012 | Larson et al. | |

OTHER PUBLICATIONS

International Search Report and Written Opinion for PCT Application PCT/US2016/028638, dated Aug. 4, 2016, 9 pages.

* cited by examiner

*Primary Examiner* — Robert J Sandy
(74) *Attorney, Agent, or Firm* — Brake Hughes Bellermann LLP

(57) ABSTRACT

In one aspect, a device can include a clip member including a first end and a second end. The first end can be configured to attach to cooking device and the second end can be configured to engage a handle member of the cooking device. The clip member can be configured to be positioned in a handle position where the clip member can be configured to hold the handle member in a substantially fixed position relative to the cooking device when in the handle position.

20 Claims, 13 Drawing Sheets

CLIP FOR USE WITH A COOKING DEVICE

RELATED APPLICATION

This application claims priority to and the benefit of U.S. Application No. 62/150,416, filed Apr. 21, 2015, entitled "Multi-Purpose Handle Clip", which is incorporated herein by reference in its entirety.

TECHNICAL FIELD

This description generally relates to a device, apparatus, system, or article of manufacture for use with a cooking device. In particular, the description relates to a clip for use with a cooking device. The cooking device can have a handle and a lid. The clip can be configured to engage with the cooking device, the handle, and/or the lid.

BACKGROUND

A cooking device, such as a pot or pan for use with camping equipment, camping stoves, or other portable cooking equipment may include a handle and a lid. The lid may be used to retain heat within the cooking device, prevent splashing, protect the contents from falling debris or contaminants, etc. The handle may be used to lift the cooking device, etc. While such handles and lids may fulfill these or other additional functions, such handles and lids may, in some implementations, also have undesirable limitations or not fulfill other desirable functions.

SUMMARY

In one aspect, a device can include a clip member including a first end and a second end. The first end can be configured to attach to cooking device and the second end can be configured to engage a handle member of the cooking device. The clip member can be configured to be positioned in a handle position where the clip member can be configured to hold the handle member in a substantially fixed position relative to the cooking device when in the handle position.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A clip (also can be referred to as a clip member), such as a multi-purpose handle clip or multi-purpose pot handle clip may be configured to hold (e.g., automatically hold in response to a movement of the handle, couple, and/or maintain) a handle of a cooking device, such as a pot, in a position (e.g., an upright position, normal with respect to a plane aligned along a lid (also can be referred to as a lid component) and/or an opening of the cooking device) and hold a lid configured to engage the cooking device in a position relative to the cooking device. The clip may likewise be configured to hold the handle (also can be referred to as a handle member) in place relative to the container when the lid is not engaged with the cooking device. Such a clip may be moved at least in part over the handle, such as by moving (e.g., snapping) the clip over a portion of the handle. In some implementations, the handle, or a portion thereof, be moved at least in part over the clip such that the handle can be engaged with the clip. In some implementations, the handle may be held by the clip in an upright position (or another position). The handle may be held by the clip, for example, while cooking or to accommodate pouring out contents of the cooking device without exposing a user to hot liquid or gases from the contents of the cooking device.

In at least one embodiment, a clip may be reversed in position relative to the cooking device, such as by manually detaching, reversing, and re-attaching the clip to the cooking device. In some implementations, the clip may be attached on the other side of the handle in this configuration. Accordingly, the clip can be attached on either side of a handle of a cooking device. It should be noted that such configurations are merely examples.

Figure 1A:
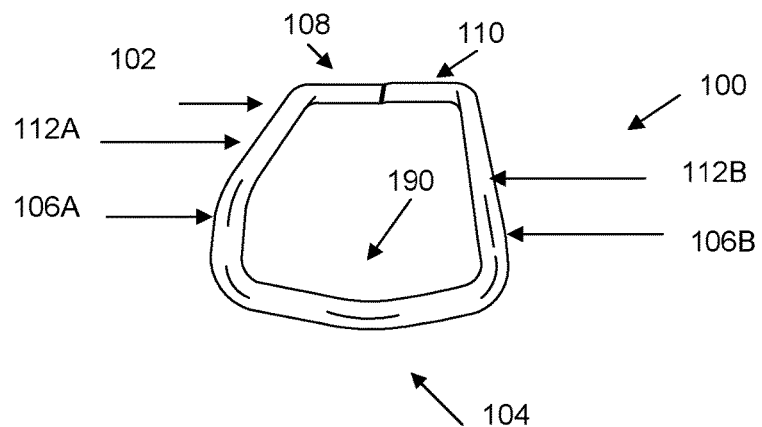
FIG. 1A illustrates an end view of a clip in accordance with an embodiment.
Figure 1B:
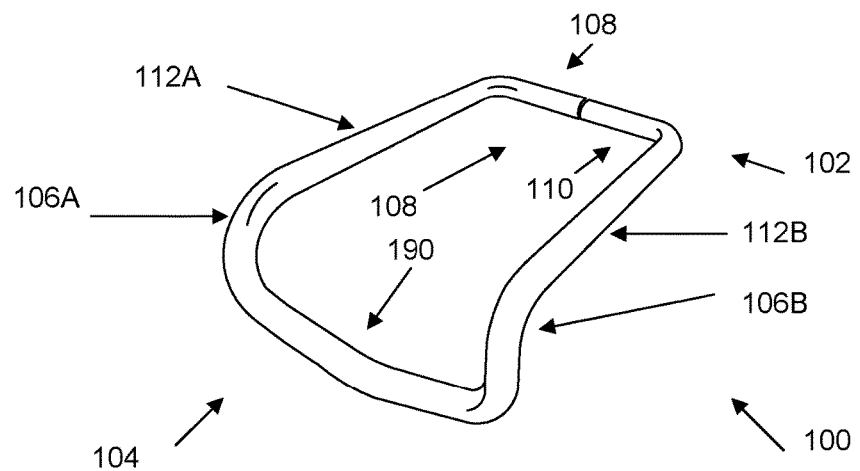
FIG. 1B illustrates a perspective view of the clip shown in FIG. 1A.
Figure 1C:
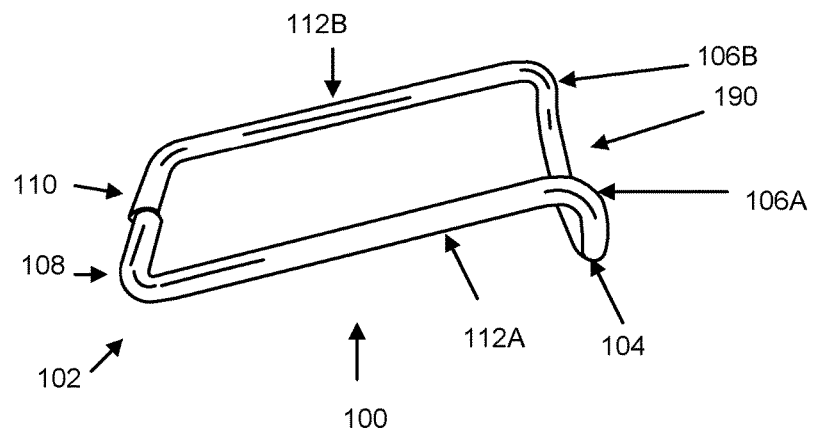
FIG. 1C illustrates a side view of the clip shown in FIGS. 1A and 1B.

FIG. 1A illustrates an end view of a clip member (clip) 100 in accordance with an embodiment. FIG. 1B illustrates a perspective view of clip 100, and FIG. 1C illustrates a side view of clip 100. With reference to FIGS. 1A through 1C, clip 100 may have a first end 102 and a second end 104 (which can be referred to as end portions). In some implementations, the second end 104 can be on an opposite side of the clip relative to the first end 102. In this configuration first end 102 may also be referred to as a cooking device end and the second end 104 may be referred to as a lid end. Clip 100 may further include curved portions 106A and 106B (which can be curved on both sides of the clip 100). In this embodiment, first end 102 may be adapted to or configured to engage a portion of a cooking device (e.g., a portion (e.g., a mounting component) of a cooking device configured to engage with a handle of the cooking device) (shown below).

For example, first end 102 may include one or more portions, such as those illustrated in FIGS. 1A, 1B, and/or 6A through 6D (shown below). In this example, first end 102 may include left connecting member 108 and right connecting member 110. Left connecting member 108 and right connecting member 110 may be sized, shaped, and/or spaced appropriately to connect clip 100 to a cooking device as shown and illustrated below with regard to at least FIGS. 2A through 4E and 7A through 7D.

For example, left connecting member 108 and right connecting member 110 may be sized, shaped, and or spaced appropriately to be inserted in one or more openings in a cooking device or in a mounting component (shown below) physically attached to (e.g., rotatably coupled to) the cooking device. Such a mounting component may be semi-permanently (or permanently (e.g., fixedly)) attached to the cooking device such as through welding, mechanic connectors such as rivets or snaps, adhesives, and/or adhesives (e.g., epoxies). In some implementations, clip 100 may be rotatable about an axis defined at least in part by left connecting member 108 and/or right connecting member 110 in response to an applied force, such as those described more fully below.

In some implementations, left connecting member 108 and right connecting member 110 may be merged as a single connecting member. In such implementations, the clip 100 can be attached to the cooking device, but still may be rotatably coupled to the cooking device.

In some implementations, clip 100 may include a first side 112A and a second side 112B. The first side 112A is coupled to curved portion 106A and the second side 112B is coupled to the curved portion 106B. In some implementations, the clip 100 may include various configuration of the first and second sides 112A, 112B.

In some implementations, the first side 112A, the second side 112B, and/or the curved portions 106A, 106B can collectively define a recess 190. The recess 190 can be configured to engage with (or be disposed around) a first side of a handle of a cooking device (as shown in, for example, FIG. 3B) or a second side of a handle of a cooking device (as shown in, for example, FIG. 7C). These different configurations are described in more detail below.

As shown in FIGS. 1A through 1B, the second end 104 of the clip 100 has a curved portion. In some implementations, the curved portion can be configured to engage with a lid of a cooking device. In some implementations, the clip 100 may be included on only one side of a cooking device.

In some implementations, clip 100 may be composed of a variety of materials, including metals such as copper, aluminum, steel, stainless steel, iron, and the like, metal alloys, ceramics, carbon fibers, carbon ceramic blends, other composite materials, etc. Other materials, of course, may be used without departing from the scope of claimed subject matter.

Figure 2A:
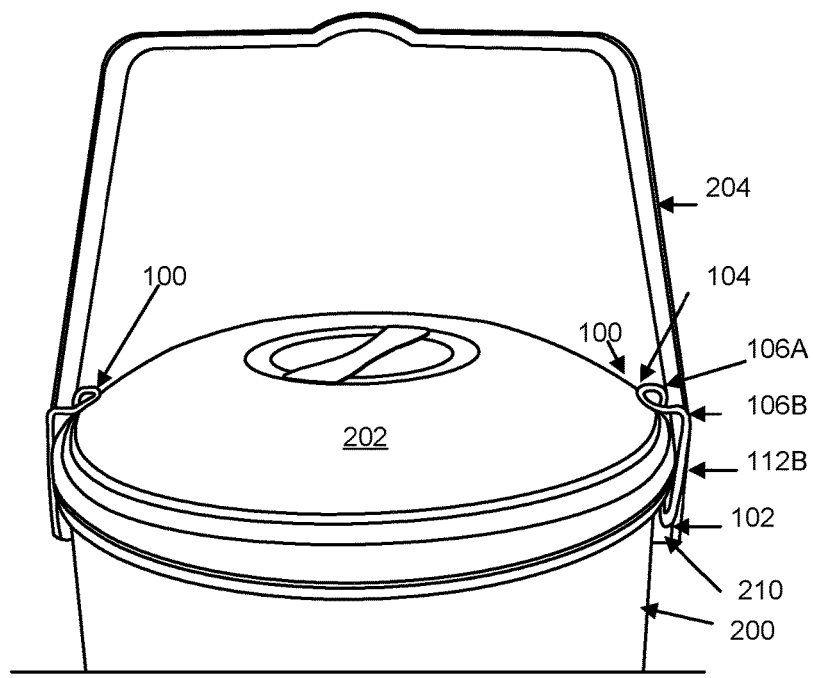
FIG. 2A illustrates the clip shown in FIGS. 1A through 1C engaged with a cooking device, a lid, and a handle.
Figure 2B:
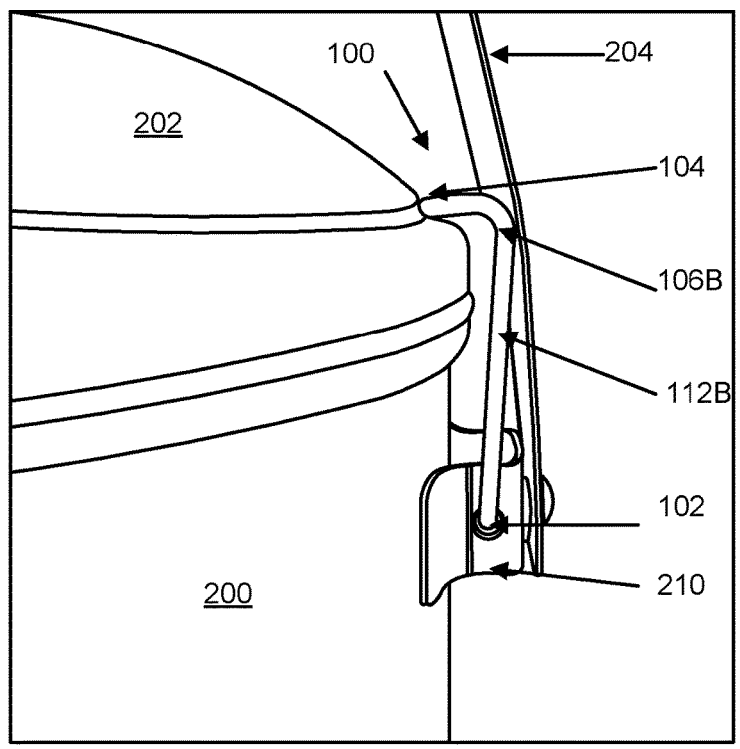
FIG. 2B illustrates a side view of the clip, cooking device, lid, and handle in FIG. 2A.
Figure 2C:
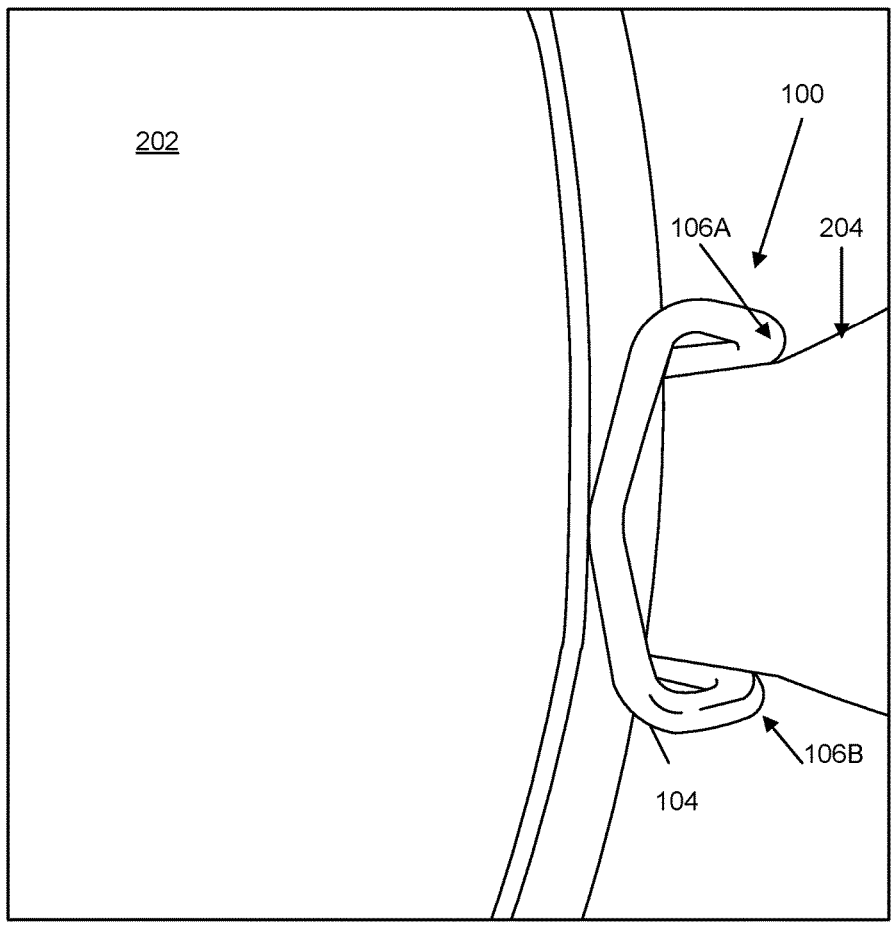
FIG. 2C illustrates a plan view of the clip, cooking device, lid, and handle in FIGS. 2A and 2B.

FIGS. 2A through 2D illustrate various views of clip 100 engaged with, operably coupled to, or rotatably coupled, to a cooking device 200. For example, FIG. 2A illustrates a top perspective view of clip 100 engaged with a cooking device 200, a lid 202, and a handle 204. FIG. 2B illustrates a side view of clip 100, cooking device 200, lid 202, and handle 204. FIG. 2C illustrates a plan view of clip 100, cooking device 200, lid 202, and handle 204 in FIGS. 2A and 2B.

Figure 2D:
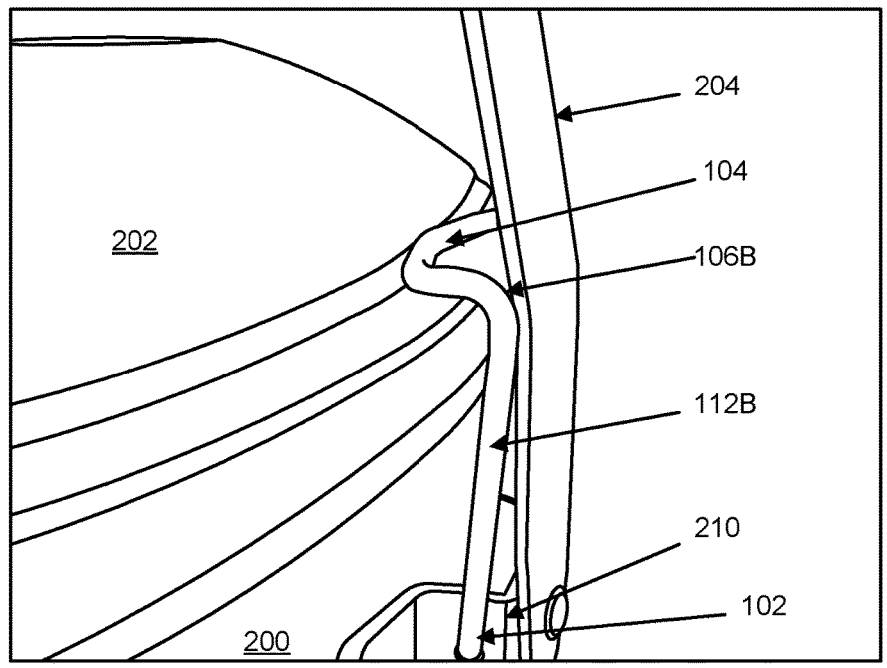
FIG. 2D illustrates a side perspective view of the clip, cooking device, lid, and handle in FIGS. 2A through 2C.

FIG. 2D illustrates a side perspective view of clip 100, cooking device 200, lid 202, and handle 204 in FIGS. 2A through 2C.

With regard to FIGS. 2A through 2D, clip 100 may further engage with (e.g., interact with) lid 202, and handle 204 and may, when described in sequence, illustrate a manner in which clip 100 may engage with lid 202 and/or handle 204, at least in part to hold lid 202 and/or handle 204 in respective fixed position(s) (e.g., substantially stable position(s), stable position(s)).

In an example embodiment, a distance between second side 112B and first side 112A may be configured to contact (e.g., snap onto, receive, be coupled to, engage) handle 204. In some implementations, the handle 204 can engage with the clip 100 in an at least partially stable manner (e.g., a fixed manner, a loose manner to allow for movement between the handle 204 and/or clip 100). Likewise, a distance or shape between curved portions 106A and 106B may be configured to contact (e.g., snap onto, receive, be coupled to, engage) handle 204 in an at least partially fixed manner. In some implementations, some combination of curved portions 106A, 106B, first side 112A, and/or second side 112B may also be configured to contact (e.g., snap onto, receive, engage) handle 204 in an at least partially fixed manner.

In some implementations, curved portions 106A and/or 106B may form 90 degree (or less) angles relative to first side 112A and/or second side 112B, respectively. In some implementations, curved portions 106A and/or 106B may form angles greater than 90 degrees relative to first side 112A and second side 112B, respectively. In this manner, clip 100 at may apply a pressure or bias towards lid 202, handle 204, or both at least in part to hold lid 202, handle 204, or both respectively.

In some implementations, when at least a portion of the handle 204 is in contact with the clip 100 (e.g., disposed between curved portions 106A, 106B), the handle 204 can apply a force to the clip 100. In some implementations, the force applied to the clip 100 can cause the second end 104 to apply a force to the lid.

In this example, cooking device 200 may be formed from a variety of materials, including metals such as copper, aluminum, steel, stainless steel, iron, and the like, metal alloys, ceramics, carbon fibers, carbon ceramic blends, other composite materials, etc. Other materials, of course, may be used without departing from the scope of claimed subject matter.

In some implementations, cooking device 200 may include a mounting component 210. In such an embodiment, mounting component 210 may be configured to be coupled to (e.g., engage) at least one end (or portion) of clip 100, such as first end 102. For example, mounting component 210 may include a bracket or other structure adapted to receive first end 102 of clip 100, such as via attachment holes 212. In this example, mounting component 210 may include attachment holes configured to receive left connecting member 108 and right connecting member 110. Mounting component 210 may be configured to allow at least some movement of clip 100, such as rotation around an axis defined by the attachment holes 212, first end 102, and/or left connecting member 108 and right connecting member 110.

As discussed in more detail below, clip 100 may be rotated about the described axis to engage multiple positions, such as a lid position configured to hold (e.g., maintain, substantially hold) lid 202 in a fixed position, a handle position configured to hold (e.g., maintain, substantially hold) handle 204 in a fixed position, and/or a dual position to hold (e.g., maintain, substantially hold) lid 202 and handle 204 simultaneously in a fixed position. In some implementations, clip 100 can be engaged with the handle 204 such that the handle 204 may be prevented from (e.g., substantially prevented from) being moved rotatably with respect to the cooking device.

With regard to FIGS. 2A through 2D, clip 100 is shown being been rotated into a dual position to engage with and hold, in a fixed position, lid 202 and handle 204. In such a dual position, second end 104 may be positioned in contact with (e.g., applying a bias to, snapping onto, receiving, engaging) a portion of lid 202 at least in part to hold lid 202 in place with respect to the cooking device. Likewise, in such a dual position curved portions 106A and/or 106B, side portions 112A and/or 112B, or combinations thereof may be in at least partial contact with (e.g., snapped onto, receive, received by, engaged with) one or more portions of handle 204 at least in part to hold (e.g., substantially hold, maintain) handle 204 in a fixed position (e.g., prevented or substantially prevented from rotating with respect to the cooking device). Though, it should be noted that this is merely an illustrative example relating to a clip and claimed subject matter is not limited in this regard.

Figure 3A:
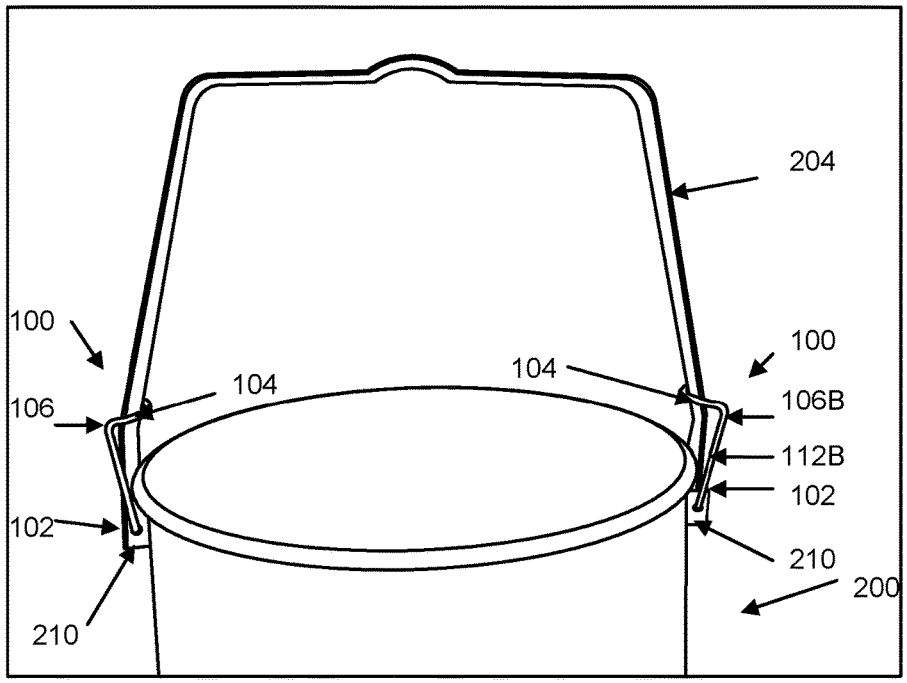
FIG. 3A illustrates a side view of a clip engaged with a cooking device and handle.
Figure 3B:
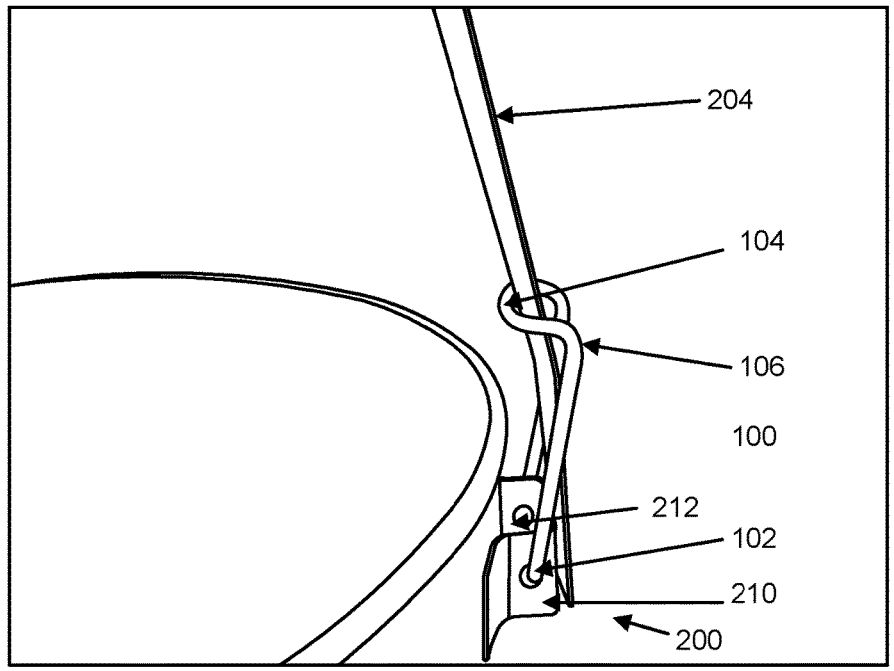
FIG. 3B illustrates a top perspective view of the clip, handle, and cooking device in FIG. 3A.
Figure 3C:
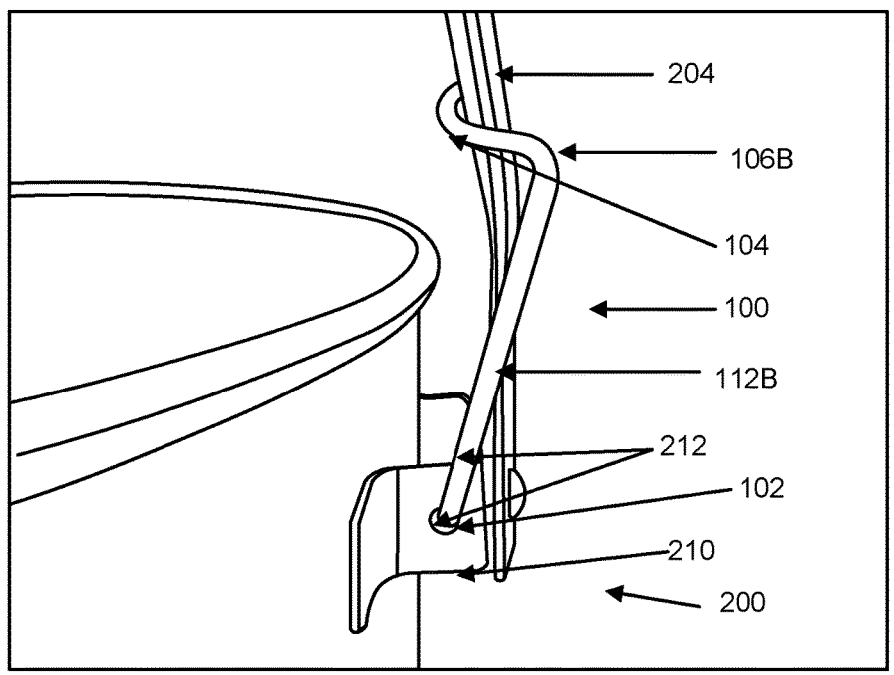
FIG. 3C illustrates a side view of the clip, handle, and cooking device in FIGS. 3A and 3B.
Figure 3D:
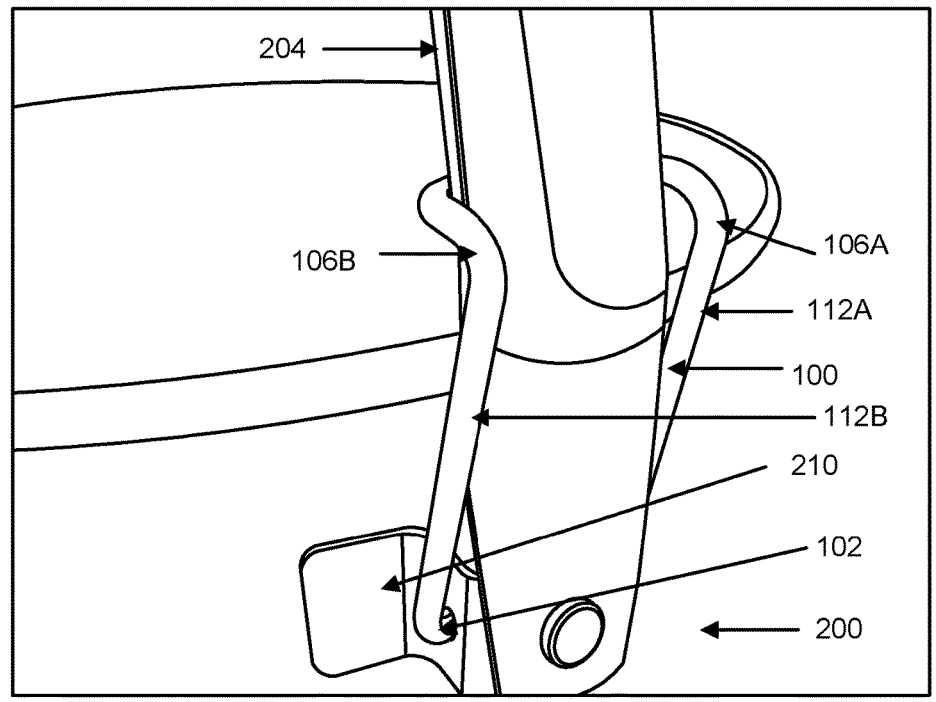
FIG. 3D illustrates an end view of the clip, handle, and cooking device in FIGS. 3A through 3C.
Figure 3E:
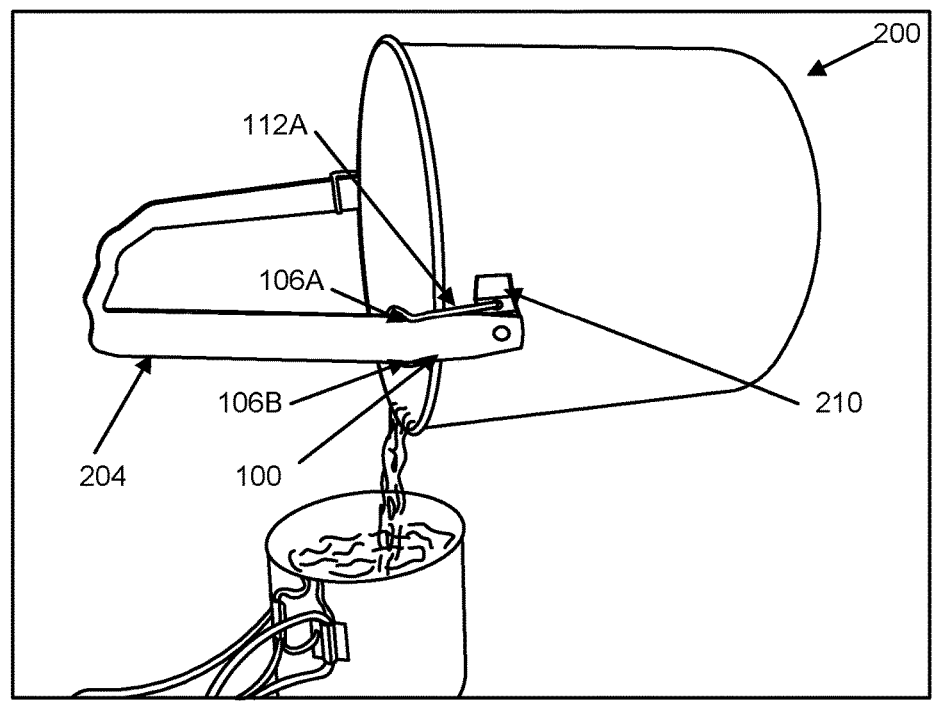
FIG. 3E illustrates a side view of the clip, handle, and cooking device of FIGS. 3A through 3D in a pouring position.

FIG. 3A illustrates a side view of clip 100 engaged with cooking device 200 and handle 204. FIG. 3B illustrates a top perspective view of clip 100, handle 204, and cooking device 200. FIG. 3C illustrates a side view of clip 100, handle 204, and cooking device 200. FIG. 3D illustrates an end view of clip 100, handle 204, and cooking device 200. FIG. 3E illustrates a side view of clip 100, handle 204, and cooking device 200.

With regard to FIGS. 3A through 3E, a user may rotate handle 204 to the position illustrated in FIGS. 3A through 3E. The user may likewise move clip 100 into the handle position illustrated in FIGS. 3A through 3E.

For example, the user may rotate clip 100 and/or engage the clip 100 into position relative to handle 204, such as by engaging clip 100 onto handle 204. For example, clip 100 may be positioned so that handle 204 may be received by (e.g., snapped onto, held, engaged with) second end 104, between curved portions 106A and 106B and side portions 112A and 112B or combinations thereof. In this manner, clip 100 may be configured to hold handle 204 in a substantially fixed position which may be beneficial for cooking with and/or pouring out the contents of cooking device 200. Similarly, a user may rotate clip 100 into a lid position (not shown), such as by rotating clip 100 towards a lid (shown above and below). In this example, the clip may be engage with (e.g., snapped into) place relative to lid 202 to substantially hold lid 202 in place. Though, again, this is merely an illustrative example related to a clip position and claimed subject matter should not be so limited.

Engagement in this context, and elsewhere throughout this application, may be achieved at least in part by shape, size, configuration, spacing, relative position, and relative flexibility of one or more components described as be coupled to one another. For example, curved portions 106A and 106 B may have sufficient space between curved portion 106A and curved portion 106B to surround or engage a portion of handle 204. Likewise, curved portions 106A and 106B may be formed of a material and shaped in a manner to provide sufficient force to portions of handle 204 to hold handle 204 in place, yet substantially retain their shape, size, spacing, etc. In some implementations, such force on portions of handle 204 may be overcome by a user supplying sufficient force to disengage curved portions 106A and 106B, such as by temporarily bending portions of handle 204, or clip 100, for example. In this example, clip 100 may have sufficient rigidity and flexibility to allow it to return to its shape after being bent, forced, or otherwise moved around, onto, and/or off of handle 204. Similarly, side portions 112A and 112B may be configured to have similar properties and responses to applied forces as curved portions 106A and 106B. Of course, this is merely an illustrative example, and claimed subject matter should not be so limited.

In this example, clip 100 may be positioned to be transitioned between a lid position or a dual position and a handle position. For example, clip 100 is illustrated in the dual position in FIGS. 2A through 2D, while being illustrated in the lid position in FIGS. 3A through 3E. Clip 100 may be transitioned between the dual position and the handle position by manually rotating second end 104 towards, into contact with, or into close proximity with handle 204 (without being in contact with the lid 202). In some implementations, though not shown, clip 100 may be moved into a lid position by manually rotating second end 104 towards lid 202 and engaging or otherwise securing second end 104 relative to lid 202. In this example, the lid position is configured to hold lid 202 substantially in place with respect to the cooking device 200 and the handle position is configured to hold handle 204 substantially fixed relative to cooking device 200, such that handle 204 may not rotate with respect to cooking device 200. In some implementations, clip 100 may allow a user to pour out the contents of cooking device 200 without a user being exposed excessively to hot fluids, gases, or the like. In some implementations, maintaining clip 100 in the handle position may help to prevent or limit how much handle 204 may be heated while cooking using cooking device 200

FIGS. 4A through 4E illustrate moving handle 204 and clip 100 into a dual position, such as a position that may hold lid 202 and handle 204 in fixed (e.g., substantially fixed) positions relative to cooking device 200. In this example, handle 204 may be rotated from a first position illustrated in FIG. 4A, such as a low position or a horizontal position, up through a second position illustrated in 4B, a third position shown in FIG. 4C, and into a fourth position illustrated in FIG. 4E, such as a vertical or high position. In first position, clip 100 may be in a disengaged position, wherein such disengaged position may be configured so that clip 100 does not engage with or hold in place lid 202 or handle 204. In some implementations, in the first position, handle 204 may, in response to being rotated (e.g., rotated with respect to the cooking device 200 and within a plane aligned along the direction of an axis of rotation of the clip 100, rotated along an axis orthogonal to an axis of rotation of the clip 100), apply a pressure to clip 100 at least in part to rotate or otherwise move clip 100 in direction A towards cooking device 200 and/or lid 202. In this example, if handle 204 is moved (e.g., rotatably moved) from the first position, through the second position, the third position and subsequently into the fourth position, clip 100 may be rotated or moved in direction 410 at least in part in response to the rotational movement of handle 204 into a dual position, illustrated in 4D, wherein such dual position may be configured to hold lid 202 and/or handle 204 substantially in place relative to cooking device 200.

Figure 4A:
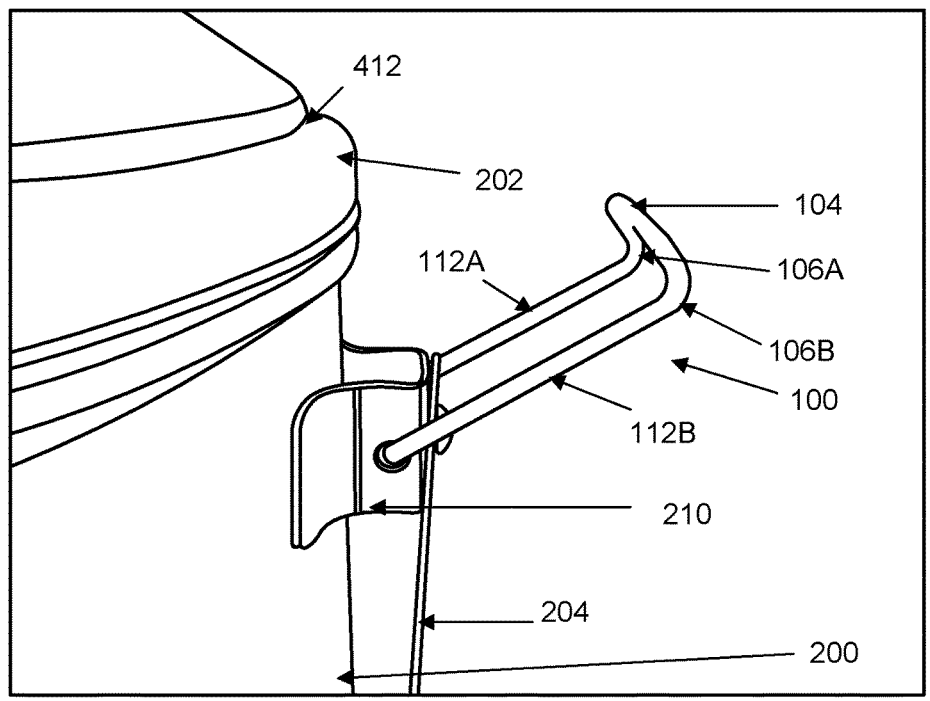
FIG. 4A illustrates a side perspective view of the clip in an open position not engaged with the lid.
Figure 4B:
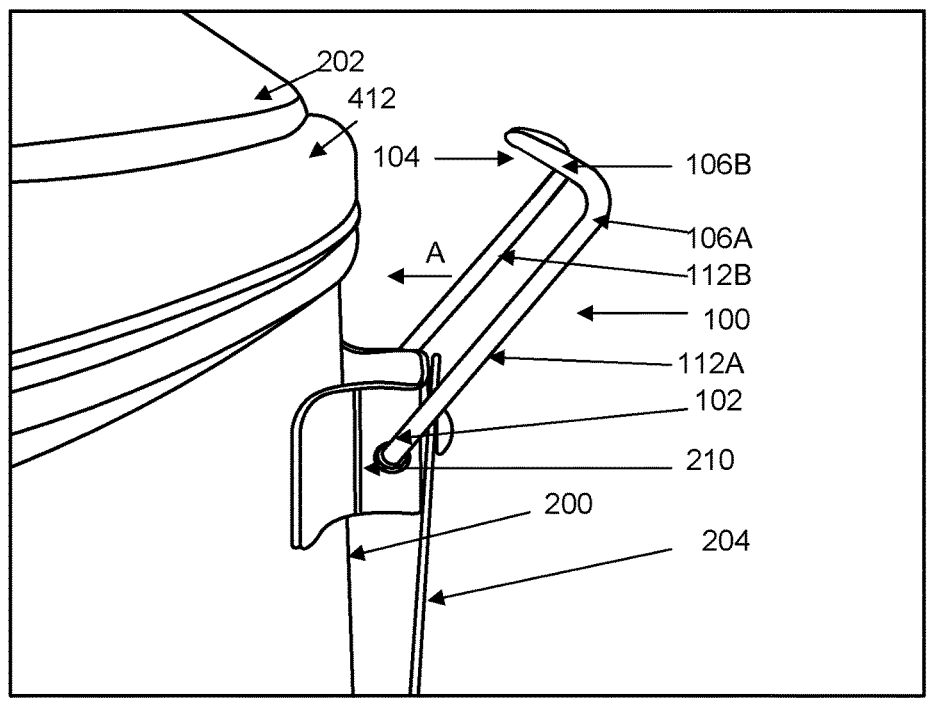
FIGS. 4B through 4E illustrate the clip shown in FIGS. 4A and 4B engaging with the lid at least in part in response to moving the handle.
Figure 4C:
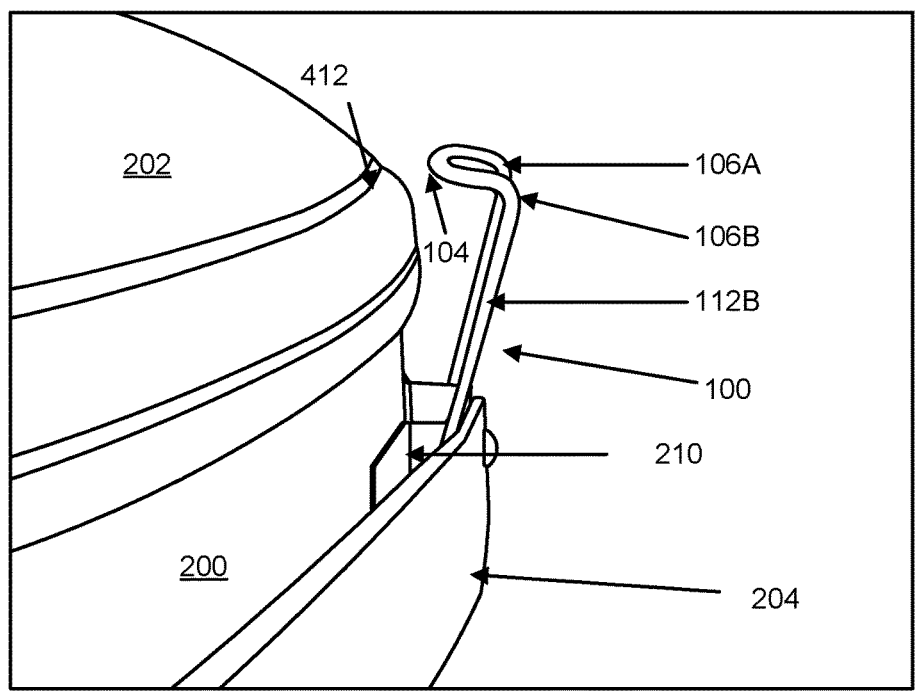
Figure 4D:
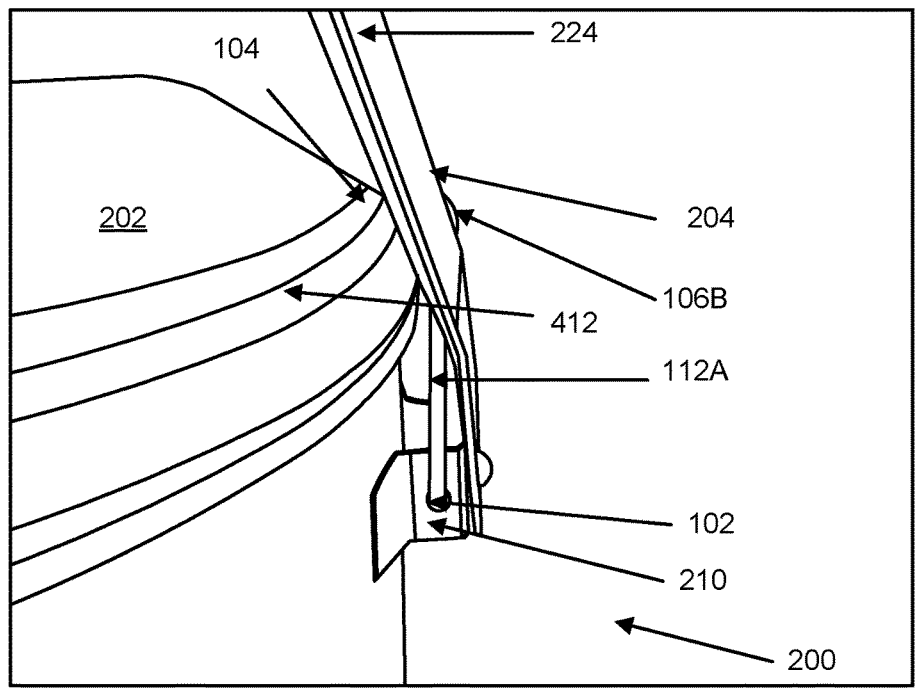
Figure 4E:
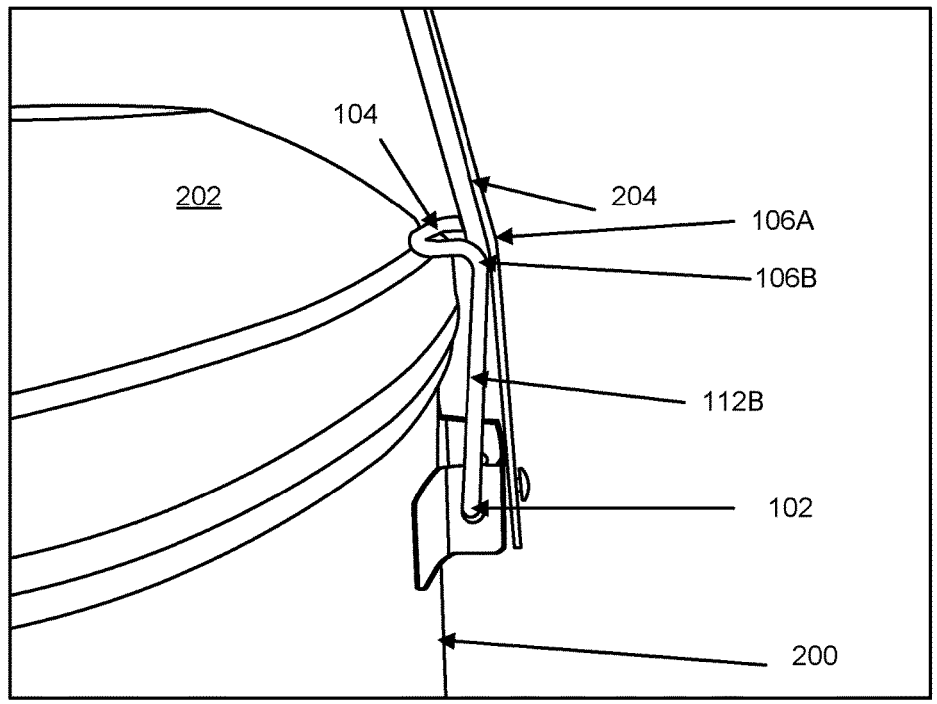

In some implementations, the clip 100 can be moved from the configuration shown in, for example, FIG. 4E to the configuration shown in, for example, FIGS. 3A through 3E by moving the clip 100 in a direction opposite direction A. In some implementations, the clip 100 can be moved from the configuration shown in, for example, FIGS. 3A through 3E to the configuration shown in, for example, FIG. 4E by moving the clip 100 along direction A.

In this example, handle 204 may apply a mechanical force to clip 100 or side portion 112B (or side portion 112A if rotated in the opposite direction). For example, handle 204 may be rotatably mounted to cooking device 200 and rotational force applied to handle 204 may be converted to a lateral (and/or rotational) force applied to clip 100 by the overlap, position, configuration, and relative movement of handle 204 and clip 100. Likewise, upon being rotated into the second position, clip 100 may engage lid 202 and/or handle 204, by applying a pressure to or engaging lid 202 and/or handle 204. Such engagement may be achieved by second end 104 engaging with lid 202 and at least a portion of second end 104 applying a force to lid 202. For example, lid 202 may include a lip 412 and second end 104 may be configured to apply a pressure to, or engage in place relative to, lip 412 and lid 202. Such a force or pressure may be applied by a rigidity, flexibility, spring force, and/or bias created at least in part through the relative shapes, sizes, rigidity, flexibility, and/or positions of lid 202, lip 412, handle 204, and at least one of the portions of clip 100. Likewise, with regard to handle 204, such engagement may be achieved by clip 100 having a shape configured to engage handle 204, such as by receiving a portion of handle 204 and/or being received by a portion of handle 204, and secure handle 204 with respect to cooking device 200. For example, clip 100 may be sized and/or shaped such that curved portions 106A and 106B and side portions 112A and 112B, or combinations thereof, may be spaced, shaped, sized, etc. so that at least one of curved portions 106A and 106B and side portions 112A and 112B may engage with (e.g., receive, snap onto, apply a force to, fit snugly with) a portion of handle 204 or vice versa. In some implementations, clip 100 may be at least partially flexible and sized or adapted to simultaneously, or substantially simultaneously, exert sufficient force on lid 202 and handle 204 to at least partially hold lid 202 and handle 204 fixed relative to cooking device 200.

Figure 5A:
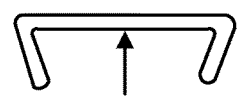
FIGS. 5A through 5C illustrates alternatively shaped lid ends of the clips shown in FIGS. 1A through 4B.
Figure 5B:
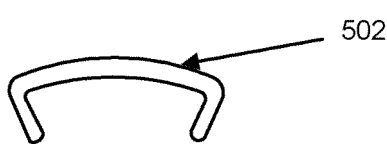
Figure 5C:
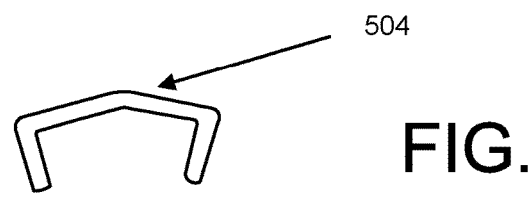

FIGS. 5A through 5C illustrate several potential shapes for second end 104 of clip 100. As discussed above, second end 104 of clip 100 may be adapted, such as shaped or sized to engage lid 202 and/or handle 204 as described above. With reference to FIG. 5A, clip 100 may include a flat end 500. Clip 100 may alternatively include a curved end 502 (shown in FIG. 5B) or a pointed end 504 (shown in FIG. 5C). Each such shape may be configured to engage lid 202.

In some configurations lid 202 may include one or more locking portions (not shown) wherein such locking portions may be adapted, such as shaped and/or sized, to receive one of the ends of clip 100 such as flat end 500, curved end 502, and/or pointed end 504. For example, lid 202 may be formed to include a first and a second locking portions shaped and/or sized to receive second end 104 of clip 100 for a variety clip shapes, such as those shown and described (or some other shape). Such shapes may be formed by casting, molding, forming, machining, etc. metal or any of the other materials described herein.

In some implementations, handle 204 may be sized, shaped, formed, or otherwise configured to have a shape compatible with one of flat end 500, curved end 502, pointed end 504, or other shaped ends. For example, handle 204 may be shaped to fit into (e.g., conform with) at least a portion of one of the particular shaped ends. For example, the shape of the end may engage with (e.g., fit closely with, snap onto, apply pressure to) handle 204. Handle 204 may fit generally within the end while handle 204 may be held in a fixed position (e.g., substantially fixed position) by other portions of clip 100, such as curved portions 106A and 106B, side portions 112A and 112B, or combinations thereof.

Figure 6A:
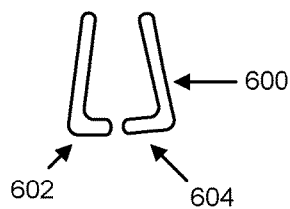
FIGS. 6A through 6C illustrates alternatively shaped cooking device ends of the clips shown in FIGS. 1A through 5C.
Figure 6B:
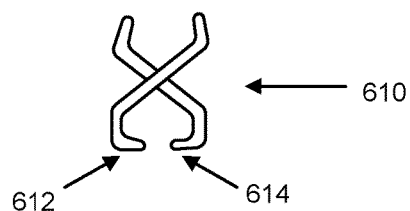
Figure 6C:
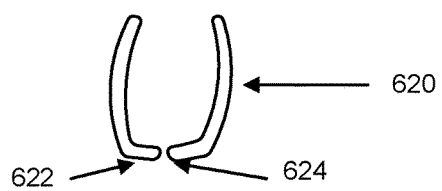

FIGS. 6A through 6C illustrate additional shapes for first end 102 (and/or side portions) of clip 100. As discussed above, first end 102 of clip 100 may be adapted, such as shaped or sized to engage cooking device 200, such as by engaging with mounting component 210. For example, first end 102 may include left connecting member 108 and right connecting member 110 may be sized and shaped to fit into attachment holes 212.

FIG. 6A illustrates a first shape 600. First shape 600 includes first attachment member 602 and second attachment member 604. The side portions in FIG. 6A are non-parallel and taper inward. In some implementations, the side portions in FIG. 6A can be non-parallel and taper outward. In some implementations, the side portions in FIG. 6A may be non-parallel to engage in a desirable fashion with, for example, a handle 204 and/or a lid 202.

FIG. 6B illustrates a second shape 610. Second shape 610 includes first attachment member 612 and second attachment member 614. The side portions in FIG. 6B intersect and are non-parallel. In some implementations, the side portions in FIG. 6B may intersect to provide strength and/or to enable desirable coupled of the first attachment member 612 and/or the second attachment member 614 with a cooking device 200. In some implementations, the side portions in FIG. 6B may intersect to engage in a desirable fashion with, for example, a handle 204 and/or a lid 202.

FIG. 6C illustrates a third shape 620. Third shape 620 includes first attachment member 622 and second attachment member 624. The side portions in FIG. 6C are curved. In some implementations, the side portions in FIG. 6C can curve in a different direction. In some implementations, the side portions in FIG. 6C can be curved to engage in a desirable fashion with, for example, a handle 204 and/or a lid 202.

In these examples, attachment members 602, 604, 612, 614, 620, and/or 624 may be adapted to engage with mounting component 210, such as my inserting the respective ends at least partially into attachment holes 212. In some implementations, the various attachment members shown and described above may be attach to cooking device 200, such as by engaging (e.g., snapping into place) with respect to mounting component 210 or being held in place by spring or bias pressure.

For example, rather than include attachment holes 212 mounting component 210 may include one or more recessed portions or areas adapted to receive a combination of the attachment members shown and described above and/or receive other differently shaped, spaced, positioned, and/or sized attachment members. Such shapes may be formed by casting, molding, forming, machining, etc. metal or any of the other materials described herein.

Figure 7A:
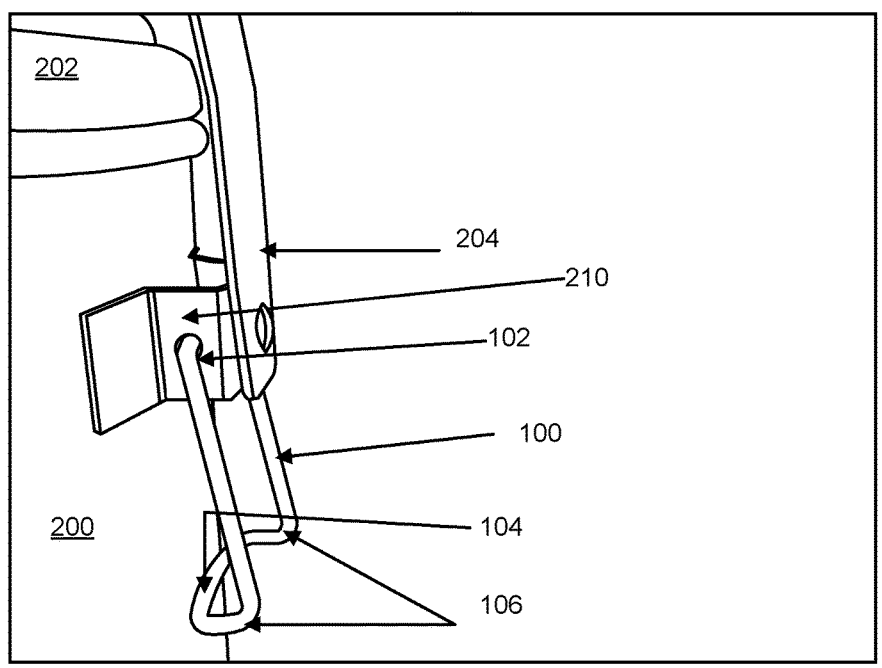
FIGS. 7A through 7D illustrate a clip in a handle position configured to engage a cooking device and a handle.
Figure 7B:
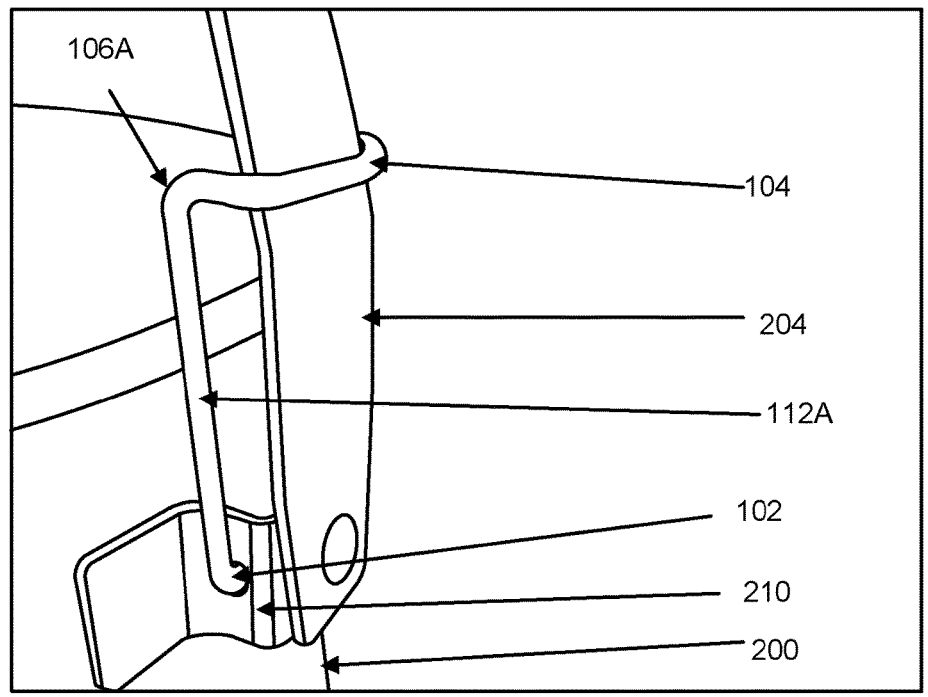
Figure 7C:
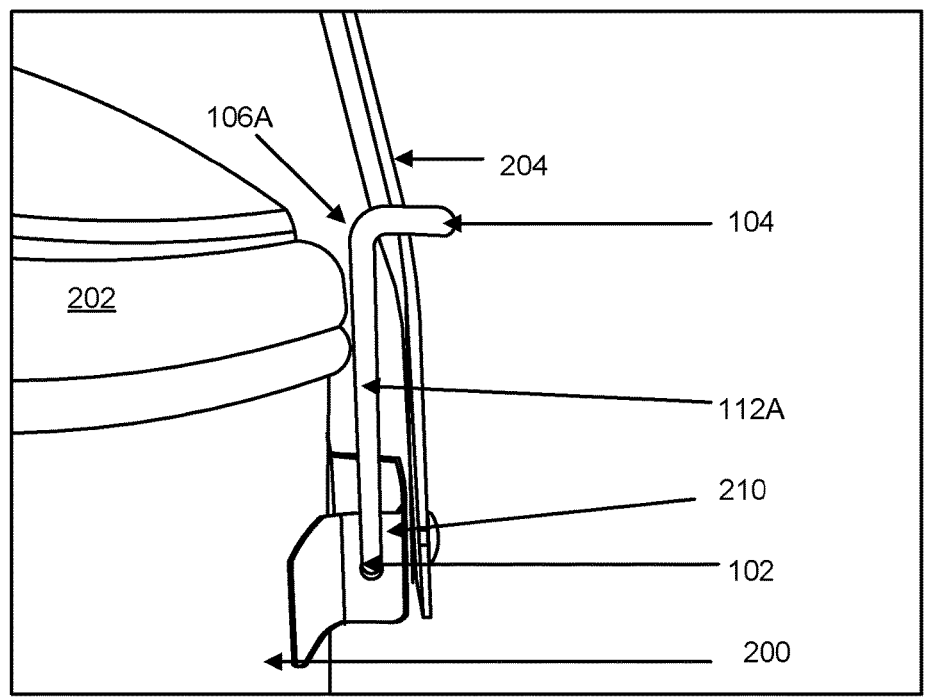
Figure 7D:
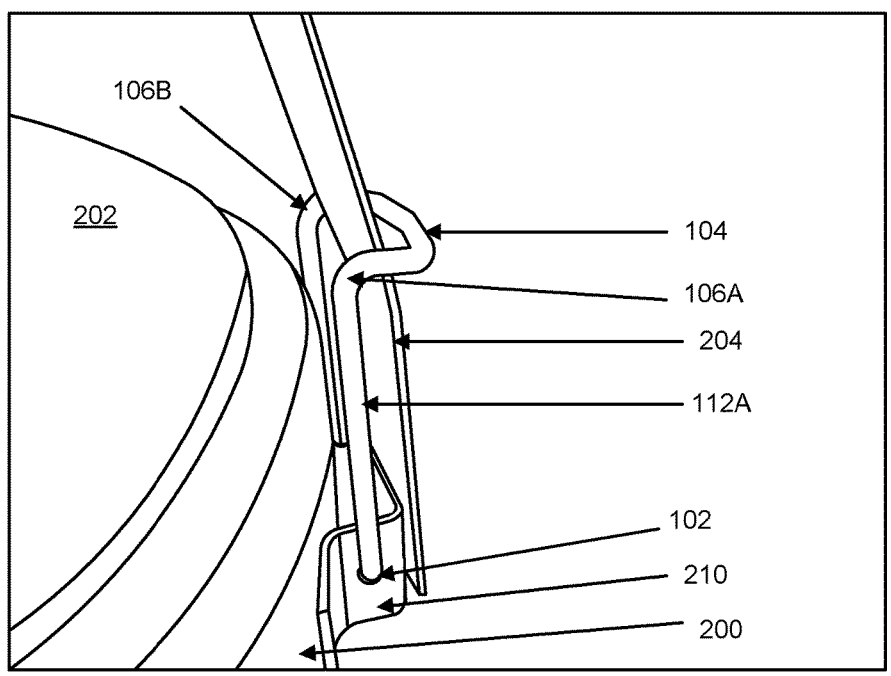

FIGS. 7A through 7D illustrate clip 100 in a handle position configured to engage cooking device 200 and handle 204. FIG. 7A illustrates clip 100 in an open position, such that clip 100 does not substantially restrict the movement of handle 204. The open position may be achieved by manually reversing an orientation of clip 100 relative to cooking device 200 and mounting component 210. For example, clip 100 shown in the figures above may be manually removed and reattached such that the position of second end 104 may be reversed with respect to cooking device 200 (and handle 204). FIGS. 7B through 7D illustrate clip 100 in a handle position, such as a position adapted hold handle 204 in an upright position, as shown. In this example, clip 100 may be manually moved by a user from the open position to the handle position. For example, a user may rotate handle 204 into a substantially vertical position and move clip 100 into the handle position, such as by rotating clip 100 onto handle 204 or snapping clip 100 onto handle 204. In this example, clip 100, handle 204, or a combination there of may be sized or shape to engage one another in a manner that may require a specific force or range of forces from a user to engage or disengage. Clip 100 may, in some implementations, include a bias or spring force to hold clip 100 in place relative to handle 204. In this example, handle 204 may be used to pour out the contents of cooking device 200 without excessively exposing a user to heated liquids or gases, and may also be used at least in part to hold handle 204 in place to prevent handle 204 from being overly exposed to heat during the cooking process. Though, of course, these are merely illustrative examples and claimed subject matter is not limited in this regard.

In one general aspect, a device can include a clip member including a first end and a second end. The first end can be configured to attach to cooking device and the second end can be configured to engage a handle member of the cooking device. The clip member can be configured to be positioned in a handle position where the clip member can be configured to hold the handle member in a substantially fixed position relative to the cooking device when in the handle position. The device can include any combination of the following.

In some implementations, the clip member is configured to be positioned in the handle position at least in part by rotating the handle member relative to the cooking device. In some implementations, the clip member is positioned in the handle position at least in part by engaging the handle member with the clip member at a position on the handle member. In some implementations, a portion of the clip member is further configured to engage a lid component where the clip member is configured to be positioned in a lid position to hold the lid component in a substantially fixed position relative to the cooking device. In some implementations, the clip member is configured to be moved between the handle position and the lid position. In some implementations, the clip member is configured to be positioned in a dual position to simultaneously hold a lid component and the handle member in respective substantially fixed positions relative to the cooking device. In some implementations, the clip member is configured to be positioned in the dual position at least in part by rotating the handle member with respect to the cooking device. In some implementations, the clip member is configured to be moved between the handle position, a lid position, and the dual position. In some implementations, the clip member is configured to be positioned in a disengaged position, the disengaged position being disengaged from a handle member and a lid component. In some implementations, the clip member may be positioned in the disengaged position at least in part by rotating the handle member relative to the cooking device.

In another general aspect, an apparatus can include a clip member configured to engage a handle where the clip member can be configured to hold the handle in a substantially fixed position relative to a cooking device when in a handle position. The clip member can be configured to be positioned in the handle position at least in part in response to rotating the handle relative to the cooking device. The device can include any combination of the following.

In some implementations, the clip member is positioned in the handle position at least in part by engaging the handle with the clip member at a position on the handle. In some implementations, a portion of the clip member is further configured to engage a lid where the clip member is configured to be positioned in a lid position to hold the lid in a substantially fixed position relative to the cooking device. In some implementations, the clip member is configured to be moved between the handle position and the lid position. In some implementations, the clip member is configured to be positioned in a dual position to simultaneously hold a lid and the handle in respective substantially fixed positions relative to the cooking device. In some implementations, the clip member is configured to be positioned in the dual position at least in part by rotating the handle with respect to the cooking device. In some implementations, the clip member is configured to be moved between the handle position, a lid position, and a dual position. In some implementations, the clip member is configured to be positioned in a disengaged position where the disengaged position not holding the handle or a lid relative to the cooking device. In some implementations, the clip member is positioned in the disengaged position at least in part by rotating the handle with respect to the cooking device.

It will also be understood that when an element, such as a structure, component, or the like, is referred to as being on, connected to, engaged with, coupled to, in mechanical communication with, attached to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation illustrated in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus, device, article of manufacture, and/or methods described herein may be combined in any combination, except mutually exclusive combinations. The implementations described herein can include various combinations and/or sub-combinations of the functions, components and/or features of the different implementations described.

What is claimed is:

1. A device, comprising:
 a handle member of a cooking device; and a clip member including a first end and a second end,
the first end configured to attach to the cooking device,
the second end configured to engage the handle member of the cooking device,
the clip member configured to be positioned in a handle position, the clip member configured to hold the handle member in a substantially fixed position relative to the cooking device when in the handle position.

2. The device of claim 1, wherein the clip member is configured to be positioned in the handle position at least in part by rotating the handle member relative to the cooking device.

3. The device of claim 1, wherein a portion of the clip member is further configured to engage a lid component, the clip member is configured to be positioned in a lid position to hold the lid component in a substantially fixed position relative to the cooking device.

4. The device of claim 3, wherein the clip member is configured to be moved between the handle position and the lid position.

5. The device of claim 1, wherein the clip member is configured to be positioned in a dual position to simultaneously hold a lid component and the handle member in respective substantially fixed positions relative to the cooking device.

6. The device of claim 5, wherein the clip member is configured to be positioned in the dual position at least in part by rotating the handle member with respect to the cooking device.

7. The device of claim 5, wherein the clip member is configured to be moved between the handle position, a lid position, and the dual position.

8. The device of claim 1, wherein the clip member is configured to be positioned in a disengaged position, the disengaged position being disengaged from a handle member and a lid component.

9. The device of claim 8, wherein the clip member may be positioned in the disengaged position at least in part by rotating the handle member relative to the cooking device.

10. An apparatus comprising:
a handle of a cooking device; and
a clip member configured to engage the handle, the clip member configured to hold the handle in a substantially fixed position relative to the cooking device when in a handle position,
the clip member is configured to be positioned in the handle position at least in part in response to rotating the handle relative to the cooking device.

11. The apparatus of claim 10, wherein a portion of the clip member is further configured to engage a lid, the clip member is configured to be positioned in a lid position to hold the lid in a substantially fixed position relative to the cooking device.

12. The apparatus of claim 11, wherein the clip member is configured to be moved between the handle position and the lid position.

13. The apparatus of claim 10, wherein the clip member is configured to be positioned in a dual position to simultaneously hold a lid and the handle in respective substantially fixed positions relative to the cooking device.

14. The apparatus of claim 13, wherein the clip member is configured to be positioned in the dual position at least in part by rotating the handle with respect to the cooking device.

15. The apparatus of claim 10, wherein the clip member is configured to be moved between the handle position, a lid position, and a dual position.

16. The apparatus of claim 10, wherein the clip member is configured to be positioned in a disengaged position, the disengaged position not holding the handle or a lid relative to the cooking device.

17. The apparatus of claim 16, wherein the clip member is positioned in the disengaged position at least in part by rotating the handle with respect to the cooking device.

18. A device, comprising:
a handle member of a cooking device; and
a clip member including a first end portion having a first end and a second end, a second end portion having a first end and a second end, a first side portion having a first end and a second end, and a second side portion having a first end and a second end,
the first end of the first end portion connected to the first end of the first side portion, the second end of the first side portion connected to the first end of the second end portion, the second end of the second end portion connected to the first end of the second side portion, and the second end of the second side portion connected to the second end of the first end portion to form an opening between the connected first end portion, the second end portion, the first side portion and the second side portion,
the first end portion of the clip member configured to attach to the cooking device,
the second end portion of the clip member configured to engage at least the handle member or a lid member of the cooking device,
the clip member configured to be positioned in a handle position, and
the opening of the clip member configured so that when the handle member is disposed in the opening, the clip member holds the handle member in a substantially fixed position relative to the cooking device when in the handle position.

19. The device of claim 18, wherein the first side portion and the second side portion include a first curved portion and a second curved portion, respectively.

20. The device of claim 19, wherein the first curved portion is aligned with a first plane and the second curved portion is aligned within a second plane, the first plane is parallel to the second plane.

* * * * *